United States Patent
Johns et al.

(10) Patent No.: US 10,350,565 B2
(45) Date of Patent: Jul. 16, 2019

(54) CATALYST DUMPING SPOOL ASSEMBLY

(71) Applicant: Chevron U.S.A. Inc., San Ramon, CA (US)

(72) Inventors: Jeff William Johns, Draper, UT (US); Douglas Gayle McDaniel, Moss Point, MS (US); Anthony Terrell Tanner, Moss Point, MS (US); Edward Earl Eden, Jr., Mobile, AL (US)

(73) Assignee: Chevron U.S.A. Inc., San Ramon, CA (US)

( * ) Notice: Subject to any disclaimer, the term of this patent is extended or adjusted under 35 U.S.C. 154(b) by 176 days.

(21) Appl. No.: 15/448,849

(22) Filed: Mar. 3, 2017

(65) Prior Publication Data

US 2018/0250648 A1 Sep. 6, 2018

(51) Int. Cl.
- *B01J 8/00* (2006.01)
- *B01J 8/04* (2006.01)
- *B01J 8/22* (2006.01)

(52) U.S. Cl.
CPC .............. *B01J 8/0035* (2013.01); *B01J 8/003* (2013.01); *B01J 8/0453* (2013.01); *B01J 8/22* (2013.01); *B01J 2208/00362* (2013.01); *B01J 2208/00761* (2013.01); *B01J 2208/00769* (2013.01); *B01J 2208/00787* (2013.01)

(58) Field of Classification Search
CPC ......... B01J 8/0035; B01J 8/003; B01J 8/0453
USPC ...................................................... 422/219
See application file for complete search history.

(56) References Cited

U.S. PATENT DOCUMENTS

| | | | |
|---|---|---|---|
| 2,361,571 A * | 10/1944 | Crowley, Jr. | ............ B01J 8/125 208/165 |
| 3,775,805 A | 12/1973 | Mitchell et al. | |
| 4,630,779 A | 12/1986 | Suuchi et al. | |
| 4,781,211 A * | 11/1988 | Cormier | .................. F16K 35/06 137/383 |
| 5,028,314 A | 7/1991 | Goldberg et al. | |
| 6,203,766 B1 | 3/2001 | Kawakami et al. | |
| 8,202,498 B2 | 6/2012 | Killen et al. | |
| 9,545,649 B2 | 1/2017 | Johns et al. | |

OTHER PUBLICATIONS

U.S. Appl. No. 14/780,130, filed May 27, 2015.

* cited by examiner

*Primary Examiner* — Huy Tram Nguyen
(74) *Attorney, Agent, or Firm* — Ryan, Mason & Lewis, LLP

(57) ABSTRACT

Disclosed herein is a catalyst dumping spool assembly for unloading used catalyst from an inside of a reactor, comprising: a reactor, and a catalyst dumping spool comprising a first end operatively connected to the reactor, the first end having a catalyst inlet through which the used catalyst is introduced into, a second end having a catalyst discharge outlet whereby the used catalyst exits the catalyst dumping spool, wherein a first device for controlling used catalyst transfer into the catalyst inlet is positioned proximate the first end, and a second device for controlling the used catalyst transfer from inside the catalyst inlet through the catalyst discharge outlet is positioned proximate the second end, and further wherein the catalyst dumping spool further comprise a gas fluidization inlet and a water fluidization inlet located between the first and second devices.

8 Claims, 3 Drawing Sheets

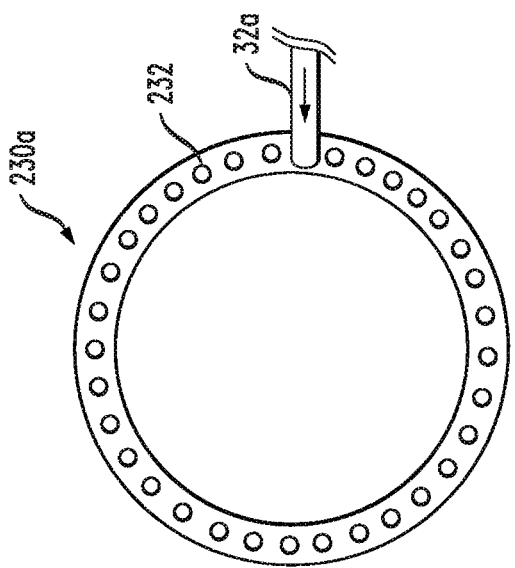
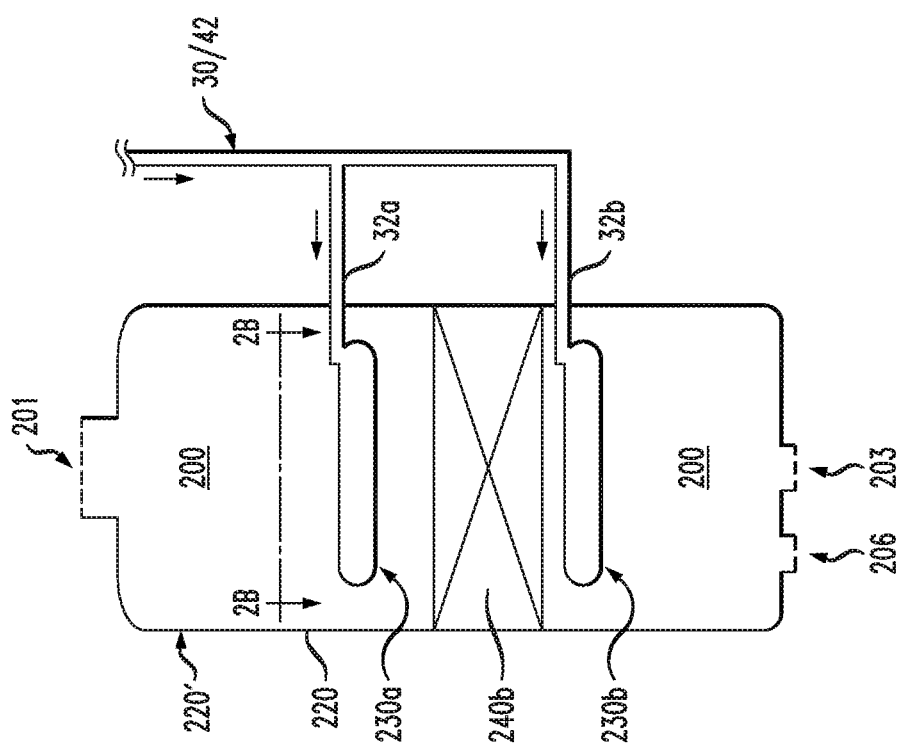

CATALYST DUMPING SPOOL ASSEMBLY

BACKGROUND OF THE INVENTION

1. Technical Field

The present invention relates generally to a catalyst dumping spool assembly for removing used catalyst from a reactor.

2. Description of the Related Art

Hydroprocessing units must be shutdown periodically to conduct maintenance and to change catalyst. Unit shutdown procedures must be developed and executed with excellence to protect personnel, prevent incidents, and to minimize costs and duration. Catalysts are used in a petroleum refining plant, chemical plant and the like for facilitating chemical reactions.

Typically, catalysts have to be periodically unloaded from the reactor to be exchanged, since activity of the catalyst gets weak as the catalysts are poisoned by, for example, sedimentation of carbon, metal or the like. The catalysts also need to be unloaded from the reactor for repairing or examining the plant.

In general, the hydroprocessing catalyst is dumped from the bottom nozzle of a reactor when the catalyst must be changed. Catalyst flow from the dump nozzle may stop during the dumping process due to, for example, plugging of the nozzle, clumping of the catalyst, etc. In addition, catalyst flow may be stopped at times to prevent overflowing of the vessel collecting the dumped catalyst or to change the catalyst collection vessel.

Presently, in the industry valves have been used to control catalyst dumping, but typically these valves are metal plates, or other mechanical devices which try and unplug the nozzle or spool when catalyst fails to dump. Also, a vacuum may be used to assist catalyst dumping through the nozzle. A vibrating device to try and shake the catalyst out of the reactor may also be used, but this can damage the reactor.

Accordingly, there is a need for a catalyst dumping spool for use in hydroprocessing reactor shutdown processes such that the processes can be conducted with maximum efficiency and minimum duration while safeguarding personnel and equipment.

SUMMARY OF THE INVENTION

In accordance with one embodiment of the present invention, there is provided a catalyst dumping spool assembly for removing used catalyst from inside of a reactor, comprising: a reactor, and a catalyst dumping spool comprising a first end operatively connected to the reactor, the first end having a catalyst inlet through which the used catalyst is introduced into, a second end having a catalyst discharge outlet whereby the used catalyst exits the catalyst dumping spool, wherein a first device for controlling used catalyst transfer into the catalyst inlet is positioned proximate the first end, and a second device for controlling the used catalyst transfer from inside the catalyst inlet through the catalyst discharge outlet is positioned proximate the second end, and further wherein the catalyst dumping spool further comprises a gas fluidization inlet and a water fluidization inlet located between the first and second devices.

In accordance with a second embodiment of the present invention, there is provided a method for removing used catalyst from an inside of a reactor, the method comprising:

(a) operatively connecting a first end of a catalyst dumping spool to a reactor, the first end having a catalyst inlet through which the used catalyst is introduced into, a second end having a catalyst discharge outlet whereby the used catalyst exits the catalyst dumping spool, wherein a first device for controlling used catalyst transfer into the catalyst inlet is positioned proximate the first end, and a second device for controlling the used catalyst transfer from inside the catalyst inlet through the catalyst discharge outlet is positioned proximate the second end, and further wherein catalyst dumping spool further comprises a gas fluidization inlet and a water fluidization inlet located between the first and second devices, (b) positioning the first device to a position to introduce the used catalyst from inside the reactor into the catalyst inlet of the catalyst dumping spool;

(c) positioning the second device to a position to transfer the used catalyst from inside the catalyst inlet through the catalyst discharge outlet of the catalyst dumping spool and into a first catalyst receiving vessel in fluid communication with the catalyst discharge outlet; and (d) positioning the second device to a position to stop the flow of the used catalyst through the catalyst discharge outlet and into the first catalyst receiving vessel when the first catalyst receiving vessel is substantially full.

The present invention is based on the surprising discovery that the use of the catalyst dumping spool assembly of the present invention unexpectedly allows used catalyst to be removed faster and more completely from a reactor, thereby reducing shutdown time for the unit. The use of the catalyst dumping spool assembly of the present invention also unexpectedly allows for a greater amount of used catalyst to be removed faster and more completely from a reactor in a shorter time period. Accordingly, the catalyst dumping spool assembly of the present invention provides for a greater amount of used catalyst to be removed from a reactor in a simple, cost-efficient manner thereby allowing for shorter times to shut down the reactor.

BRIEF DESCRIPTION OF THE DRAWINGS

FIG. 2A is a schematic sectional view of a reactor having a quench gas distribution system, according to an embodiment of the present invention; and FIG. 2B shows a quench ring of the reactor of FIG. 2A as seen in plan view.

DETAILED DESCRIPTION OF THE PREFERRED EMBODIMENTS

Figure 1A:
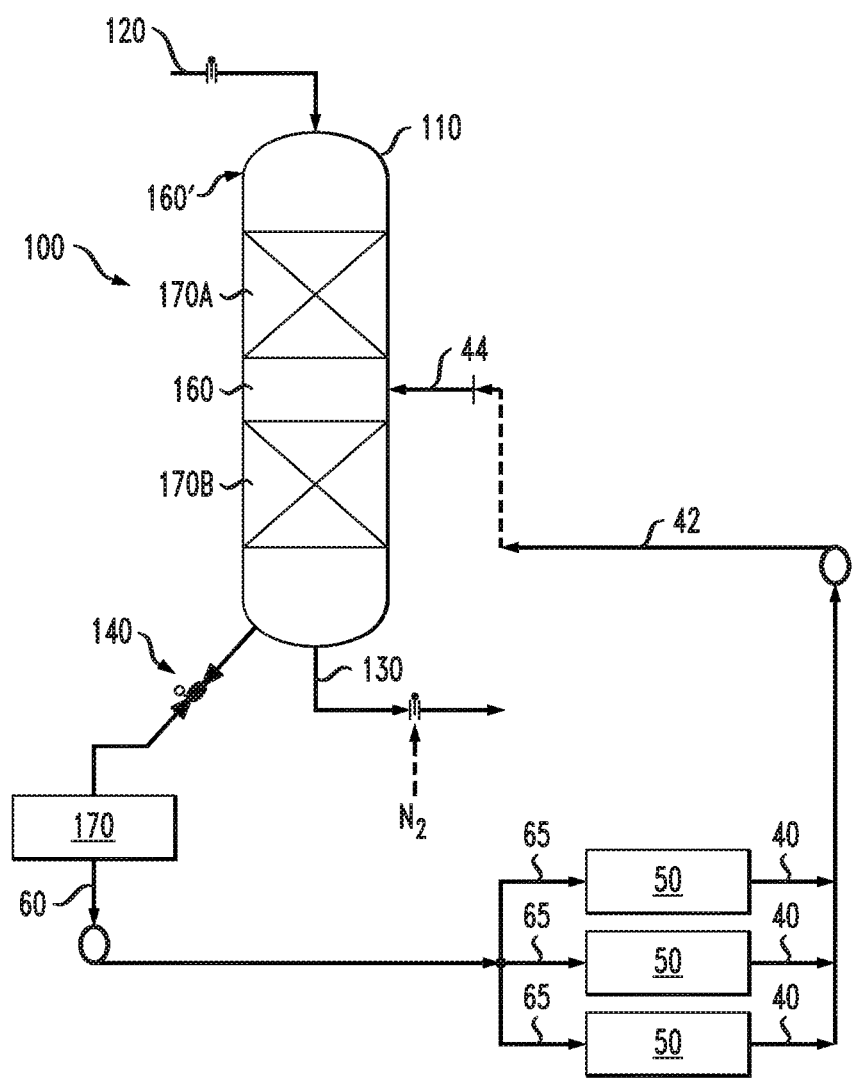
FIG. 1A is a schematic sectional view of a reactor provided with the catalyst dumping spool operatively connected to the reactor according to an embodiment of the present invention.

Hydroprocessing reactor shutdown processes must be done safely to protect personnel yet quickly to minimize lost production. Typically, spent catalyst has self-heating properties; and in the presence of oxygen it can spontaneously heat up as it oxidizes. During conventional shutdowns, reactors have been kept under inert nitrogen during shutdown and cleanup to prevent catalyst contact with oxygen. Inert vessel entry, e.g., entering a reactor under nitrogen gas, exposes personnel to possible nitrogen asphyxiation and has resulted in fatalities. Also, only specially trained personnel are allowed to enter reactors kept under inert conditions, thereby routinely preventing engineers from performing inspections, possibly leading to sub-standard work and premature future shutdowns.

Shutdown processes as disclosed herein eliminate many of the problems associated with prior art shutdown procedures. Furthermore, shutdown processes as disclosed herein have the advantage of providing fast and efficient reactor cooling to a temperature allowing manual entry into the reactor. Such processes have the further advantage of minimizing damage to valuable equipment of a hydroprocessing system. Moreover, such processes have the additional advantage of decreased danger to personnel during reactor shutdown and cleaning. Such shutdown processes may comprise a plurality of component methods, or phases. In one embodiment, the initial water introducing phase is carried out according to U.S. Pat. No. 9,545,649, the contents of which are incorporated by reference herein. In general, the water introducing phase can be carried out as follows:

i) Shutting Off Hydrocarbon Feed to the Reactor

In an embodiment, processes for shutting down a hydroprocessing reactor and for removing catalyst from the reactor as disclosed herein (hereafter "shutdown processes") may comprise shutting off hydrocarbon feed to the reactor. Prior to shutting off the hydrocarbon feed, a final operating temperature of the reactor may be recorded.

ii) Stripping Hydrocarbon from the Catalyst

After the hydrocarbon feed to the reactor has been discontinued, shutdown processes may further comprise stripping hydrocarbons from the catalyst. Hydrocarbon stripping may be conducted at a temperature greater than the final reactor operating temperature. Prior to shutting off the hydrocarbon feed to the reactor, a final operating temperature, $T_F$, of the reactor may be recorded. The reactor may then be heated above temperature $T_F$ to minimize the required stripping time.

In an embodiment, hydrocarbons may be stripped from the catalyst with circulating $H_2$ gas at a minimum temperature not less than ($T_F$+25° F.); that is to say, hydrocarbons may be stripped from the catalyst at a temperature at least 25° F. (14° C.) above the final reactor operating temperature. In an embodiment, hydrocarbon stripping may be conducted at a maximum temperature at, or approaching, the design limit of the reactor. In an embodiment, hydrocarbon stripping of the catalyst in the reactor may be continued for a minimum time period of 6 hours or not less than two hours after the latest time point at which liquid hydrocarbon is detected in the separators downstream of the reactor.

During the hydrocarbon stripping phase, recycled gas may be combined with makeup $H_2$. In an embodiment, reformer $H_2$ may be eliminated from the source of makeup $H_2$ during the hydrocarbon stripping phase in order to minimize or prevent the introduction of liquefied petroleum gas (LPG) and benzene into the reactor. In addition, during the hydrocarbon stripping phase, all liquid hydrocarbons may be drained from low points, separators, and knock-out pots to prevent recontamination of the catalyst with extraneous hydrocarbons.

iii) Cooling the Reactor

The reactor may be cooled by circulating a gaseous medium through the reactor. In an embodiment, the gaseous medium may comprise a gas selected from $H_2$ gas, $N_2$ gas, and combinations thereof. In an embodiment, the gaseous medium circulating through the reactor may comprise recycle gas together with makeup $H_2$, in which case reformer $H_2$ may be removed from the makeup $H_2$ source during the reactor cooling phase to minimize catalyst contamination by benzene and light hydrocarbons.

During the reactor cooling phase, the reactor temperature may be monitored at a plurality of reactor locations, e.g., at a plurality of locations on the reactor skin (exterior surface), while the reactor is cooled to a first threshold reactor temperature. The "first threshold reactor temperature" may be defined as the reactor temperature at which the reactor cooling phase terminates, or may be terminated, without delaying the shutdown process and while safeguarding personnel and equipment. The first threshold reactor temperature will generally be greater than (>) 200° F. In an embodiment, the first threshold reactor temperature may be in the range from 205° F. to 300° F. (96° C. to 149° C.), or from 210° F. to 275° F. (99° C. to 135° C.), or from 210° F. to 250° F. (99° C. to 121° C.).

Unless otherwise specified, reference herein to "reactor temperature" refers to the highest temperature recorded at a given time point by a plurality of temperature indicators, wherein each temperature indicator is configured for independently monitoring the temperature of the reactor skin at a corresponding plurality of reactor skin locations.

In an embodiment, the reactor cooling phase may comprise cooling the reactor at a control led reactor cooling rate so as to prevent equipment damage. In an embodiment, the reactor may be cooled at the controlled reactor cooling rate to the first threshold reactor temperature with circulating $H_2$ gas and/or $N_2$ gas. In an embodiment, reactor cooling may be accelerated, within the constraints of various cooling rate criteria for preventing equipment damage, e.g., by maximizing the gas circulation rate and by maximizing the unit pressure.

Various criteria related to temperature differences, e.g., between the reactor inlet and outlet fluid temperatures and between different locations of the reactor, may be strictly adhered to during the entire shutdown process in order to minimize the risk of equipment damage. Changes in both flow rate and temperature of fluids introduced into the reactor should be made in steady increments to prevent abrupt temperature changes. In an embodiment, the rate of cooling the reactor, including the catalyst beds within the reactor, may be limited to not greater than 25° F. (14° C.) per 15 minute interval.

The reactor may be cooled at a controlled cooling rate using one or more methods for controlling the rate of reactor cooling. As non-limiting examples, the rate of reactor cooling during the reactor cooling phase can be controlled by adjusting various parameters, such as the gas circulation rate, the unit pressure, reactor effluent heat exchange with the recycle gas, the furnace setting, and the recycle compressor speed.

In an embodiment, the reactor may include a quench gas distribution system configured for distributing quench gas within the reactor during reactor operation mode (hydroprocessing). During shutdown processes, the reactor cooling phase may comprise introducing at least a portion of the $H_2$ gas into the reactor via the quench gas distribution system. At the same time, a further portion of the $H_2$ gas may be introduced into the reactor via the reactor inlet (see, for example, FIGS. 1A and 2A). The use of the quench gas distribution system, in combination with the reactor inlet, for introducing the $H_2$ gas into the reactor may serve to distribute the $H_2$ gas within the reactor, resulting in more uniform cooling of the reactor and faster overall cooling of the reactor.

iv) Removing $H_2$ Gas from the Reactor

After cooling the reactor, the shutdown process may further comprise introducing $N_2$ gas into the reactor to remove $H_2$ and light hydrocarbon gases from the reactor. In an embodiment, $H_2$ and light hydrocarbon gases may be removed from the reactor by circulating $N_2$ gas through the reactor during at least one pressure/depressure cycle, e.g., by alternately pressuring and depressuring the reactor and associated system. In an embodiment, the $N_2$ gas introducing phase may involve a plurality of alternating pressure/depressure cycles, wherein the pressure in the reactor may be increased by the introduction of $N_2$ gas into the reactor to a relatively high pressure and thereafter the reactor may be depressured by removing the $N_2$ gas from the reactor to provide a relatively low pressure in the reactor, and the pressure/depressure cycle may be repeated as appropriate.

The $N_2$ gas introducing phase may also be referred to as the purging phase, wherein the reactor may be purged by the introduction of $N_2$ gas into the reactor. At the termination of the purging phase, the shutdown process may further comprise quantifying the hydrocarbon content of the effluent discharged from the reactor; and, based on the hydrocarbon content, determining a lower explosive limit (LEL) for the reactor effluent.

After the hydrocarbons and $H_2$ gas have been removed from the reactor and the catalyst contained therein is under inert conditions, the shutdown process may further comprise installing the blinds so as to isolate the reactor from liquid or gaseous hydrocarbon ingress. In an embodiment, the LEL for the reactor effluent will be determined to be less than 10% before the blinds are installed on the reactor. In an embodiment, the catalyst may be maintained under inert conditions until the reactor has undergone water flooding, i.e., for the duration of the water introducing phase of the shutdown process discussed herein.

During the $N_2$ gas introducing phase, the reactor may undergo further cooling. Such cooling during the $N_2$ gas introducing phase may be predominantly ambient cooling. The reactor may undergo still further (ambient) cooling during the installation of the reactor blinds. In an embodiment, the first threshold reactor temperature may be selected such that after the $N_2$ introducing phase and after the installation of the reactor blinds, the reactor may typically be at, or near, a second threshold reactor temperature. The "second threshold reactor temperature" may be defined herein as the reactor temperature at which the water introducing phase may be commenced while safeguarding personnel and equipment. In an embodiment, the second threshold reactor temperature may be not greater than ($\le$) about 200° F. In a sub-embodiment, the second threshold reactor temperature may typically be in the range from about 195° F. to about 200° F. (about 91° C. to about 93° C.), or from about 198° F. to about 200° F. (about 92° C. to about 93° C.).

By estimating the degree of reactor cooling taking place during the $N_2$ gas introducing phase and during the installation of blinds, shutdown processes as disclosed herein allow the reactor cooling phase to be terminated at a first threshold reactor temperature substantially above the second threshold reactor temperature, thereby shortening the duration of the shutdown. For example, by terminating the reactor cooling phase at a temperature substantially greater than about 200° F., the shutdown process may be expedited by harnessing ambient cooling of the reactor during the $N_2$ gas introducing phase as well as during blind installation.

v) Introducing Water into the Reactor

When the reactor is at a second threshold reactor temperature, the water introducing phase of the shutdown process may be commenced. The introduction of water into the reactor rapidly cools the reactor to a third threshold reactor temperature. The "third threshold reactor temperature" may be defined herein as the reactor temperature at which personnel may safely enter the reactor. In an embodiment, the third threshold reactor temperature may be not greater than ($\le$) about 120° F. (about 49° C.), or $\le$ about 110° F. (about 43° C.), or $\le$ about 100° F. (about 38° C.).

The water may be introduced into the reactor at a controlled reactor fill rate. In an embodiment, the maximum reactor fill rate may be determined for a given reactor according to the reactor dimensions, e.g., the diameter of the reactor. In an embodiment, e.g., when the reactor may lack a quench gas distribution system, the water introducing phase may be commenced at a relatively low reactor fill rate, e.g., during a first fill phase, and the reactor fill rate may thereafter be sequentially increased, e.g., during a second fill phase and a third fill phase of the water introducing phase. In embodiments wherein the reactor includes a quench gas distribution system, the water introducing phase may be commenced at a high (e.g., maximal) reactor fill rate via the quench gas distribution system. In an embodiment, the reactor fill rate may be in the range from about 25 to about 400 gallons per minute (gpm) (about 95 to about 750 liters per minute).

The water introduced into the reactor during the water introducing phase may be at a temperature not less than ($\ge$) about 50° F. (about 10° C.). In an embodiment, the water introduced into the reactor during the water introducing phase may typically be at a temperature within the range from about 50° F. to about 150° F. (about 10° C. to about 66° C.), or from about 50° F. to about 100° F. (about 10° C. to about 38° C.). In an embodiment, the water introduced into the reactor may be at ambient temperature and ambient pressure. The water introduced into the reactor during the water introducing phase may have a chloride content not greater than ($\le$) 50 ppm. In a sub-embodiment, the water introduced into the reactor during the water introducing phase may be selected from condensed water, industrial water, treated water, reverse osmosis water, and potable water, and combinations thereof.

In an embodiment, the water introducing phase may comprise flooding the reactor with the water. The term "flooding" may be used herein to refer to introducing water into a hydroprocessing reactor to at least partially fill the reactor with water. During reactor flooding, at least one catalyst bed of the reactor may be submerged by the water, and typically all of the catalyst beds of the reactor may be submerged by the water.

In an embodiment, preliminary to the water introducing phase, a maximum hydrostatic head pressure may be determined for a given reactor, wherein the maximum pressure corresponds to a maximum amount of water in the reactor (e.g., when the reactor is completely filled). The increase in hydrostatic head pressure may be monitored during the water introducing phase. The water introducing phase may then be discontinued before the maximum hydrostatic head pressure is attained so as to avoid overfilling the reactor. Applicant has observed that overfilling the reactor may unnecessarily delay the shutdown process or startup, e.g., due to saturated insulation slowing heatup of the reactor shell and subsequent reduced pressure operation. In an embodiment, the water introducing phase may be discontinued at a pressure of about 2 to about 5 psi below (<) the determined maximum hydrostatic pressure for a given reactor.

In an embodiment, the reactor may include a quench gas distribution system, as is well known in the art of hydroprocessing. In an embodiment, the water introducing phase may comprise introducing at least a portion of the water into the reactor via the quench gas distribution system. The quench gas distribution system may comprise at least quench line and at least one quench ring in fluid communication with the quench line. Each quench ring may have a plurality of quench apertures, e.g., arranged at an upper part of the quench ring (see, e.g., FIGS. 2A-2B).

A water supply line may be coupled to at least one quench line for distributing at least a portion of the water within the reactor during the water introducing phase. In an embodiment, most (>50%) of the water introduced into the reactor during the water introducing phase may be introduced via the quench gas distribution system. In a sub-embodiment, all (100%) of the water introduced into the reactor during the water introducing phase may be introduced via the quench gas distribution system. Applicant has observed that introducing at least a portion of the water into the reactor via the quench gas distribution system serves to distribute the water more uniformly within the reactor, thereby avoiding localized cooling of the reactor so as to decrease the risk of equipment damage.

In another embodiment, a substantial portion of the water introduced into the reactor during the water introducing phase may be introduced via the reactor inlet and/or via the reactor process outlet. In embodiments wherein the reactor lacks a quench gas distribution system, all of the water introduced into the reactor during the water introducing phase may be introduced via the reactor inlet and/or the reactor process outlet.

Figure 1B:
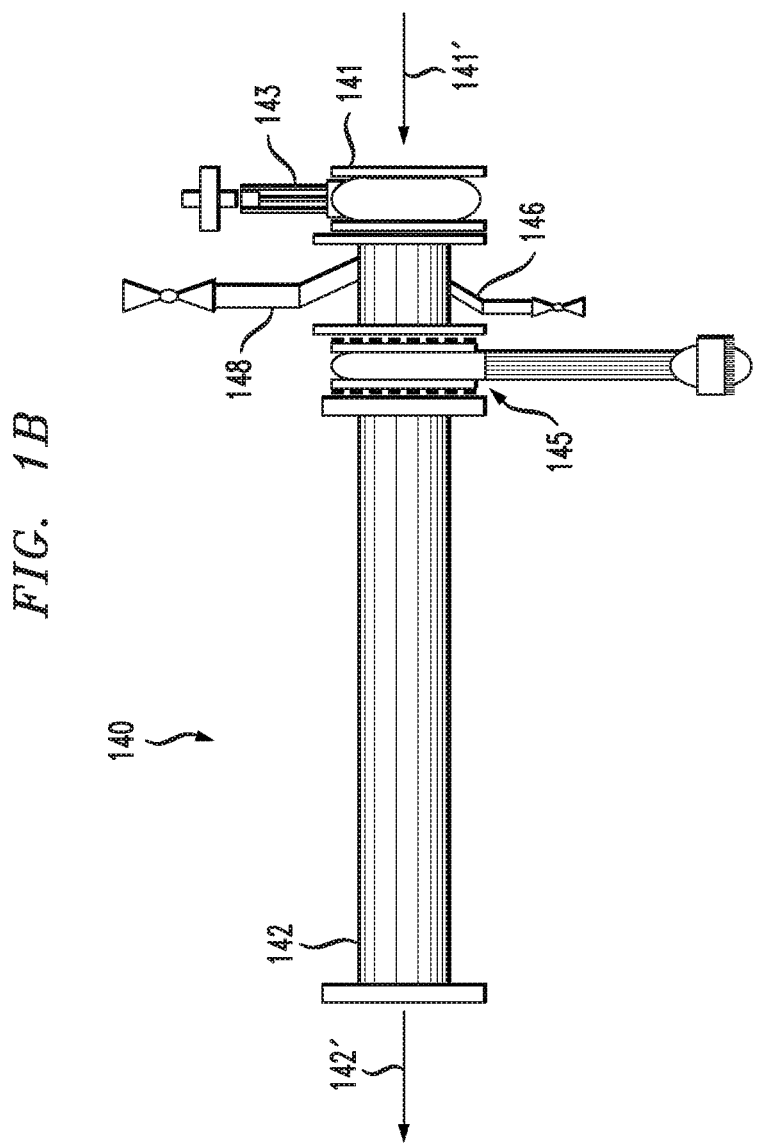
FIG. 1B schematic of one embodiment of the catalyst dumping spool of the present invention.

Embodiments of the invention will now be further described with reference to the drawings. Referring now to the drawings in more detail, FIGS. 1A and 1B show a system/scheme/assembly 100 comprising a reactor 110 and catalyst dumping spool 140 of the present invention. In system/scheme 100 of FIG. 1A, reactor 110 may represent or comprise a plurality of reactors, which may be arranged in series or in parallel. Furthermore, some hydroprocessing units may have multiple modules at can be shutdown separately while other modules continue operating. It is to be understood that variations in the flow scheme of FIG. 1A may occur in some hydroprocessing units, e.g., the flow of $H_2$ gas or other gaseous medium during reactor shutdown processes may be other than as specifically shown in FIG. 1A, without departing from the scope of the appended claims. The flow of $H_2$ gas during the hydrocarbon stripping phase and the reactor cooling phase of the shutdown process is not limited to any particular scheme or hydroprocessing, system.

Reactor 110 may comprise a reactor inlet 120, a reactor process outlet 130, and catalyst dumping spool 140 operatively connected thereto. In one embodiment, reactor 110 may be substantially cylindrical and vertically oriented. Reactor 110 may further comprise a reactor wall 160 and a reactor exterior surface or skin 160'. Temperature indicators (not shown) may be disposed at a plurality of locations, e.g., on reactor skin 160', for monitoring the reactor temperature during various phases of the shutdown process. Reactor 110 further includes catalyst beds 170A and 170B. However, as one skilled in the art will readily appreciate, shutdown processes for dumping used catalyst as disclosed herein are not limited to reactors having any particular number(s) of catalyst beds.

Catalyst dumping spool 140 for removing used catalyst from inside of reactor 110 is shown in FIG. 1B. Catalyst dumping spool 140 includes a first end 141 operatively connected to the reactor 110, the first end having a catalyst inlet 141' through which the used catalyst is introduced into, a second end 142 having a catalyst discharge outlet 142' whereby the used catalyst exits catalyst dumping spool 140, wherein the first end possesses a first device 143 for controlling used catalyst transfer into the inlet, and the second end possesses a second device 145 for controlling used catalyst transfer from inside the catalyst inlet through the catalyst discharge outlet. Catalyst dumping spool assembly 140 further includes a gas fluidization inlet 146 and a water fluidization outlet 148 located between the first and second devices 143 and 145.

In one embodiment, the first device 143 can be a valve such as a ball valve (e.g., a full port ball valve). It is to be understood that embodiments of the present disclosure do not limit the first device 143 to a particular type of valve. Thus, the first device 143 can be replaced with any suitable valve or other device for providing the functionality described herein with respect to the first device 143. Further, although one valve is illustrated in FIG. 1B, catalyst dumping spool 140 can include more than one valve. In such embodiments, catalyst dumping spool 140 can include a plurality of one type of valve and/or different types of valves. The first device 143 is used to separate the first end 141 of the catalyst dumping spool 140 from a supply of used catalyst from reactor 110.

If desired, the catalyst dumping spool 140 can include an actuator (not shown). The actuator can be coupled (e.g., mechanically coupled and/or attached) to the first device 143 and can control a state of the first device 143. The state of the first device 143 refers to a position and/or an orientation of the valve. The actuator can be a motor configured to actuate (e.g., move and/or change a state of) the first device 143, for instance. For example, the actuator can open the first device 143 (e.g., cause the valve to be open) and/or close the first device 143 (e.g., cause the valve to be closed). Further, the actuator can cause the first device 143 to be in various states in a continuum between "open" and "closed". For example, a first state can be open with respect to a second state (e.g., the first state permits a higher flow than does the second state). Conversely a first state can be closed with respect to a second state (e.g., the first state permits a lesser flow than does the second state). Embodiments of the present disclosure do not limit the actuator to a particular type.

In one embodiment, the second device 145 can be a valve such as a pneumatic knife valve ("knife valve"). It is to be understood that embodiments of the present disclosure do not limit the second device 145 to any particular type of valve. Thus, the second device 145 can be replaced with any suitable valve or other device for providing the functionality described herein with respect to the second device 145. Further, although one valve is illustrated in FIG. 1B, catalyst dumping spool 140 can include more than one valve. In such embodiments, catalyst dumping spool 140 can include a plurality of one type of valve and/or different types of valves. The second device 145 is used to separate the second end 142 of the catalyst dumping spool 140 from a supply of used catalyst from inside of front end 141 of catalyst dumping spool 140.

In one embodiment, the diameter of first end 141 and second end 142 of catalyst dumping spool 140 can be the same. In another embodiment, the diameter of first end 141 and second end 142 of catalyst dumping spool 140 can be different. In general, the diameter of first end 141 can range from about 4 inches to about 18 inches. The diameter of second end 142 can range from about 4 inches to about 18 inches.

Catalyst dumping spool 140 further includes a gas fluidization inlet 146 (e.g., nitrogen gas nozzle) and a water fluidization inlet 148 located between the first and second devices 143 and 145. In general, gas fluidization inlet 146 is for receiving a gas, e.g., nitrogen, in which to aid in catalyst fluidization. The gas distribution nozzles may be any nozzles known in the art. In embodiments, the gas distribution nozzles are low attrition nozzles. In general, water fluidization inlet 148 is for receiving water when second device 145 is closed to further aid in catalyst fluidization and prevent agglomeration of catalyst. The gas fluidization and water fluidization nozzles can be used separately or in combination and may be used with a wide range of flow rates of the gas and/or water. In addition, the gas fluidization and water fluidization nozzles can also be used separately or in combination with other gas and water fluidization nozzles on the reactor vessel.

In an embodiment, FIG. 2A is a schematic sectional view of reactor having a quench gas distribution system for use with a catalyst dumping spool assembly of the present invention. Reactor 200 may comprise a reactor inlet 201, a reactor process outlet 203, and catalyst dump pipe 206. In an embodiment, reactor 200 may be substantially cylindrical and vertically oriented. Reactor 200 may further comprise a reactor wall 220 and a reactor exterior surface or skin 220'. Temperature indicators (not shown) may be disposed at a plurality of locations, e.g., on reactor skin 220', for monitoring the reactor temperature during various phases of the shutdown process.

With further reference to FIG. 2A, the quench gas distribution system of reactor 200 may comprise first and second quench lines 32a and 32b in fluid communication with first and second quench rings 230a and 230b, respectively. First and second quench lines 32a and 32b may be in fluid communication with line 30 during the reactor cooling phase of the shutdown process for receiving $H_2$ gas from a recycle compressor (not shown); and first and second quench lines 32a and 32b may be in fluid communication with line 42 during the water introducing phase of the shutdown process for receiving water from line 40 (see, e.g., FIG. 1A). The direction of fluid flow $H_2$ gas or liquid $H_2O$) through quench lines 32a and 32b is indicated by arrows in FIGS. 2A-2B.

FIG. 2A shows two quench rings 230a and 230b. In an embodiment, reactor 200 may have other numbers of quench rings, and the number of quench rings may be equal to the number of catalyst beds of reactor 200. Shutdown processes as disclosed herein are not limited to reactors having any particular number(s) of catalyst beds or quench rings. Only one catalyst bed, 240b, is shown in FIG. 2A for the sake of clarity of illustration.

FIG. 2B shows quench ring 230a of FIG. 2A as seen in plan view along the line 2B-2B of FIG. 2A. Quench ring 230a may have a plurality of quench apertures 232. Quench ring 230a, including quench apertures 232, may be configured for the distribution of fluid (e.g., $H_2$ gas) flowing therefrom. In an embodiment, quench apertures 232 may be arranged, at least primarily, at an upper part of quench ring 230a. Quench ring 230b may be essentially the same as, or substantially identical to, quench ring 230a. Quench rings 230a and 230b may be assembled as a plurality of sections using flanges (not shown), as is known in the art.

In reactors that lack a quench gas distribution system, gas(es) for cooling reactor 200 and liquid water for flooding reactor 200 may be introduced into reactor 200 via reactor inlet 201. In an embodiment, the water for flooding reactor 200 may be introduced into reactor 200 via reactor process outlet 203.

The catalyst inside the reactor 110 is unloaded in accordance with the following steps using the above-described catalyst dumping spool assembly 140. The steps form a dumping method of the catalyst inside the reactor 110 according to the present invention.

The shutdown process first includes a water introducing phase, during which reactor 110 may be flooded with water to fluidize the used catalyst and form a catalyst slurry as discussed hereinabove. The water introducing phase may involve introducing water, having defined chemical and physical parameters or characteristics, into the reactor at a controlled fill rate. In an embodiment, water for flooding the reactor during the water introducing phase may flow to reactor 110 is schematically represented in FIG. 1A. Water from one or more lines 40 may be introduced into reactor 110 via a water supply line 42 coupled to quench line 44. Water may be introduced into reactor 110 from one or more water storage tanks 105. Alternatively or additionally, water for flooding reactor 110 may be introduced into reactor 110 in a distributed manner, e.g., via one or a plurality of quench apertures (not shown). In an embodiment, water for flooding reactor 110 may be introduced into reactor 110 via the reactor process outlet 130.

Prior to flooding reactor 110 with water, a gas flow such as nitrogen is connected to reactor outlet 130 together with a line flow meter such that the flow meter can measure a cumulative flow rate of the gas into the reactor. Once reactor 110 is flooded with water, the gas is then allowed to flow into the reactor through reactor outlet 130. Gas (e.g., nitrogen) introduction into the reactor 110 is used to effect the transfer of the solid catalyst particles from reactor 110 to catalyst receiving vessel 170. Gas introduction into reactor 110 is used to assist in maintaining the catalyst in suspension; avoid/ameliorate slumping in the bottom of the vessel and plugging of gas nozzles; and minimize catalyst attrition before introduction of catalyst to the reactor.

A gas flow such as nitrogen is also connected to gas fluidization inlet 146 together with a line flow meter. Next, first device 143 is then positioned to allow the catalyst slurry to enter the catalyst inlet of catalyst dumping spool 140. Once the catalyst slurry enters catalyst dumping spool 140, second device 145 is positioned to allow the catalyst slurry to flow through catalyst dumping spool 140 and exit the catalyst discharge outlet and into the catalyst receiving vessel 170.

When the catalyst slurry begins to flow through of catalyst dumping spool 140, water is then recycled to the quench connection as discussed above. The water also assists in maintaining adequate pressure for continued flow of the catalyst slurry into catalyst dumping spool 140. Initially, the recycle water stream 40 may need to be supplemented with fresh water make-up from one or more water tanks 50 until recycle water separation occurs at catalyst receiving vessel 170 and flows through line 60 to one or more of lines 65.

The catalyst slurry is allowed to flow in to the catalyst receiving vessel 170 until it reaches a level in which the catalyst slurry is at or near the top of the catalyst receiving vessel 170. Once catalyst receiving vessel 170 is substantially full, i.e., at or near full, a gas and water are then allowed to flow into gas fluidization inlet 146 and water fluidization inlet 148, respectively, of catalyst dumping spool 140 while monitoring the flow rate. As one skilled in the art would readily appreciate, gas and water may also be allowed to flow into other nozzles on the reactor to further assist fluidization of the catalyst slurry. In general, the flow rate should not exceed a flow that is high enough to expel catalyst from the reactor or into the reactor internals during dumping. The desired flow rate is a flow rate to meet the incipient fluidization point of the catalyst in the reactor, e.g., a nitrogen flow rate of about 0.04 to about 6 Million Standard Cubic Feet per Hour (MMSCFH) and a water flow rate of about 50 to about 400 gallons per minute (GPM). Second device 145 is then positioned to prevent or stop the flow of the catalyst slurry after catalyst receiving vessel 170 is at or near full in order to exchange catalyst receiving vessel 170 for an empty catalyst receiving vessel. During this time, first valve 143 will remain in its position. Recycle water will continue to flow into the reactor 110 to maintain pressure on catalyst dumping spool 140.

Once catalyst receiving vessel 170 is replaced with a new catalyst receiving vessel, second device 145 is then positioned to allow for continued flow of the catalyst slurry through catalyst dumping spool 140 and exit the catalyst discharge outlet and into the catalyst receiving vessel 170. Gas and water are discontinued into gas fluidization inlet 146 and water fluidization inlet 148. These steps are repeated until substantially all of the catalyst slurry is removed from reactor 110.

As one skilled in the art will readily understand the catalyst slurry may stop flowing from the reactor 110 prior to being substantially removed. In this embodiment, first device 143 is position to stop flow of the catalyst slurry from reactor 110. A gas and water are then allowed to flow into gas fluidization inlet 146 and water fluidization inlet 148, respectively, of catalyst dumping spool 140. Recycle water will continue to flow into the reactor 110 to assist in fluidizing the catalyst at the bottom of reactor 110. First device 143 is then positioned to allow flow of catalyst slurry from reactor 110 into catalyst dumping spool 140. These steps are repeated until substantially all of the catalyst slurry is removed from reactor 110.

During or following the catalyst dumping phase of the shutdown process, water may be rapidly and efficiently separated from the dumped catalyst slurry. In an embodiment, at least a portion of the separated water may be captured, analyzed for contaminants, and subsequently treated in a waste water handling phase of the shutdown process. Separated water that is captured or stored for treatment may also be referred to herein as "waste water".

In an embodiment, the waste water handling phase may comprise quantitatively analyzing the separated water for the presence of contaminants to provide quantitative contaminant data, and, based on the quantitative contaminant data, determining a schedule for releasing the separated water to a refinery waste water system. During this phase of the shutdown process, the rate of releasing the waste water to the refinery waste water system may be carefully controlled to be within the treating limits of the refinery waste water system.

In an embodiment, a portion of the catalyst may be retained within the reactor as "residual catalyst" after the catalyst dumping phase. Typically, the residual catalyst will represent only a small fraction of the total catalyst present in the reactor prior to commencement of the catalyst dumping phase. In an embodiment, the shutdown process may further comprise vacuuming any such residual catalyst from the reactor after the dumping phase has removed most of the catalyst. By the expression "vacuuming residual catalyst from the reactor" is meant removing residual catalyst from the reactor via suction, e.g., using a suction device capable of drawing a partial vacuum. In an embodiment, the vacuuming phase may comprise vacuuming the residual catalyst without disturbing the catalyst support balls, or the like, on the catalyst support trays.

Removing residual catalyst from the reactor by vacuuming is faster than prior art methods, such as shoveling or raking catalyst, thereby expediting the shutdown process even further. Furthermore, personnel shoveling piles of catalyst are exposed to the risk of engulfment, which could result in injury or fatality; vacuuming residual catalyst from the reactor decreases or eliminates such risks. Removing residual catalyst from the reactor by vacuuming has the added advantage of leaving less catalyst fines in the reactor internals, thereby decreasing the time required to wash the reactor internals. Reactor internals are disclosed, for example, in U.S. Pat. No. 8,202,498, Multiphase contact and distribution apparatus for hydroprocessing.

The drawings are representational and may not be drawn to scale. Modifications of the exemplary embodiments disclosed above may be apparent to those skilled in the art in light of this disclosure. Accordingly, the invention is to be construed as including all structure and methods that fall within the scope of the appended claims. Unless otherwise specified, the recitation of a genus of elements, materials or other components, from which an individual component or mixture of components can be selected is intended to include all possible sub-generic combinations of the listed components and mixtures thereof.

What is claimed is:

1. A catalyst dumping spool assembly for removing used catalyst from an inside of a reactor, comprising: a reactor, and a catalyst dumping spool comprising a first end operatively connected to the reactor, the first end having a catalyst inlet through which the used catalyst is introduced into, a second end having a catalyst discharge outlet whereby the used catalyst exits the catalyst dumping spool, wherein a first device for controlling used catalyst transfer into the inlet is positioned proximate the first end, and a second device for controlling the used catalyst transfer from inside the catalyst inlet through the catalyst discharge outlet is positioned proximate the second end, and further wherein the catalyst dumping spool further comprise a gas fluidization inlet coupled to a supply of gas and a liquid fluidization inlet coupled to a supply of liquid, the gas fluidization inlet and the liquid fluidization inlet located between the first and second devices; and further wherein:

the first device is configured to selectively transition between an open position and a closed position to control the flow of the used catalyst through the catalyst inlet; and the second device is configured to selectively transition between an open position and a closed position to control the flow of the used catalyst through the catalyst discharge outlet.

2. The catalyst dumping spool assembly of claim 1, wherein the first device is a first valve.

3. The catalyst dumping spool assembly of claim 2, wherein the first valve is a ball valve.

4. The catalyst dumping spool assembly of claim 1, wherein the second device is a second valve.

5. The catalyst dumping spool assembly of claim 4, wherein the second valve is a knife valve.

6. The catalyst dumping spool assembly of claim 1, wherein the gas fluidization inlet is configured for receiving nitrogen to aid in catalyst fluidization.

7. The catalyst dumping spool assembly of claim 1, further comprising a catalyst receiving vessel in fluid communication with the catalyst discharge outlet.

8. The catalyst dumping spool assembly of claim 7, wherein the catalyst receiving vessel is positioned below the reactor.

\* \* \* \* \*